(12) United States Patent
Kuehnel (10) Patent No.: US 8,625,532 B2
(45) Date of Patent: Jan. 7, 2014

(54) SOFT HANDOFFS IN NETWORKS

(75) Inventor: Thomas W. Kuehnel, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 394 days.

(21) Appl. No.: 12/832,327

(22) Filed: Jul. 8, 2010

(65) Prior Publication Data

US 2012/0008535 A1    Jan. 12, 2012

(51) Int. Cl.
*H04W 4/00* (2009.01)
*H04W 36/00* (2009.01)

(52) U.S. Cl.
USPC ........... 370/331; 370/230; 370/235; 370/236; 370/278; 370/282; 455/442; 455/443; 455/444

(58) Field of Classification Search
USPC ......... 370/206, 208, 230, 235, 236, 278, 282, 370/310.2, 311, 328, 329, 331; 455/422.1, 455/432.1, 436–440, 442, 443, 444
See application file for complete search history.

(56) References Cited

U.S. PATENT DOCUMENTS

| | | | |
|---|---|---|---|
| 6,351,642 B1 | 2/2002 | Corbett et al. | |
| 6,512,776 B1* | 1/2003 | Jones et al. | 370/432 |
| 6,681,115 B1 | 1/2004 | McKenna et al. | |
| 7,200,402 B2 | 4/2007 | Apostolopoulos et al. | |
| 7,647,046 B2 | 1/2010 | Huang et al. | |
| 2004/0218580 A1 | 11/2004 | Bahl et al. | |
| 2005/0063328 A1 | 3/2005 | Dunagan et al. | |
| 2007/0153805 A1* | 7/2007 | Brown | 370/395.52 |
| 2007/0255834 A1 | 11/2007 | Abhishek et al. | |
| 2008/0102834 A1 | 5/2008 | Bernhard et al. | |
| 2009/0067628 A1* | 3/2009 | Pudney et al. | 380/247 |
| 2009/0103481 A1* | 4/2009 | Mahajan et al. | 370/329 |
| 2009/0271614 A1 | 10/2009 | Oba et al. | |
| 2010/0331056 A1* | 12/2010 | Nasrabadi et al. | 455/574 |
| 2012/0008535 A1* | 1/2012 | Kuehnel | 370/311 |

FOREIGN PATENT DOCUMENTS

| | | |
|---|---|---|
| CN | 101322432 | 12/2008 |
| CN | 101366292 | 2/2009 |

OTHER PUBLICATIONS

Li, et al., "Seamless soft handoff in mobile ad hoc networks", Retrieved at << http://ieeexplore.ieee.org/stamp/stamp.jsp?tp=&arnumber=4455118&userType=inst >>, Proceedings IEEE MILCOM, Oct. 2007, pp. 1-7.

Suarez, Alvaro, "A Proactive Horizontal Handover Algorithm for WiFi WiMax Interoperable Networks", Retrieved at << http://www.iaeng.org/publication/WCE2007/WCE2007_pp1494-1499.pdf >>, Proceedings of the World Congress on Engineering 2007 vol. II, WCE 2007, Jul. 2-4, 2007, pp. 6.

"Faster handoff between Wi-Fi networks promises near-seamless 802.11 roaming", Retrieved at << http://www.physorg.com/news3716.html >>, Apr. 14, 2005, pp. 10.

"Foreign Office Action", Chinese Application No. 201110199303.7, (Aug. 22, 2013), 13 Pages.

* cited by examiner

*Primary Examiner* — Michael Thier
*Assistant Examiner* — Benjamin H Elliott, IV
(74) *Attorney, Agent, or Firm* — Wolfe-SBMC (57) ABSTRACT

Various embodiments enable a device to maintain a plurality of connections to a plurality of wireless networks simultaneously using one radio. For instance, a device can partition in time, or "time-slice", when it transmits and receives data such that a device can maintain a plurality of connections with a plurality of networks concurrently. With the plurality of connections, the device can receive multiple copies of data. In some embodiments, a device can compare multiple copies of data and determine which copy of data is a best representation. Once a best representation has been determined, it can be selected for further usage.

20 Claims, 8 Drawing Sheets

SOFT HANDOFFS IN NETWORKS

BACKGROUND

As wireless communications techniques develop and advance, so do the devices and applications which use them. One such example is the development of wireless internet access, or Wi-Fi, which allows a device to connect and use internet capabilities without traditional hardwire lines. By using a wireless connection, a user can move about with a device and maintain access to Internet services, provided that there is Wi-Fi coverage wherever the user moves to.

Traditionally, wireless coverage is provided by a base station, or access point, where the base station has a limited span of area which its signals can cover. In order to distance larger areas, multiple base stations are strategically placed in locations to more efficiently provide areas of viable signal coverage, while reducing overlap in coverage between the base stations. As a device moves out of one base station coverage area to another base station coverage area, the base station to which the device is connected may change.

To a user surfing the Internet on a connected device, the device switching from base station to base station has minor effects. However, when a user begins to use more sophisticated applications, such as Voice over Internet Protocol (VoIP), the overhead of a device disconnecting from one base station and reconnecting to another can result in more significant issues. For example, in the case of VoIP, switching from base station to base station can result in a disjointed call connection. Thus, as wireless devices, and the applications they run, become more sophisticated, continuity of data transfer becomes an increasingly important element to a successful user experience.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Various embodiments enable a device to maintain a plurality of connections to a plurality of wireless networks simultaneously, using one radio. The device can receive multiple copies of data from the plurality of connections, compare the copies of the data for a best representation, and select the best representation of the data for further usage. In at least some embodiments, a device can send data through a plurality of connected wireless networks by copying the data for each determined connection, and sending each copy through the respective connection.

BRIEF DESCRIPTION OF THE DRAWINGS

The same numbers are used throughout the drawings to reference like features.

DETAILED DESCRIPTION

Overview

Various embodiments enable a device to maintain a plurality of connections to a plurality of wireless networks simultaneously using one radio. For instance, a device can partition in time, or "time-slice", when it transmits and receives data such that the device can maintain a plurality of connections with a plurality of networks concurrently. With the plurality of connections, the device can receive multiple copies of data. In some embodiments, the device can compare multiple copies of data and determine which copy of data is a best representation. Once a best representation has been determined, the best representation can be selected for further usage.

In at least some embodiments, a device can send outgoing data to a plurality of connected wireless networks. For example, a device can determine existing wireless network connections, copy data for each determined connection, and send each copy through the respective determined connection. Upon receipt of the multiple copies, a switch can combine the copies in such a way to as to reduce or eliminate unnecessary redundancy.

In the discussion that follows, a section entitled "Example Operating Environment" is provided and describes one operating environment in which one or more embodiments can be employed. Following this, a section entitled "Maintaining Simultaneous Wireless Network Connections" describes how a mobile computing device can maintain a plurality of connections to a plurality of access points in accordance with one or more embodiments. Next, a section entitled "Data Management" describes how combiner and splitter modules, as well as coding and selector modules, can be used in conjunction to manage data transmitted and received on multiple connections in accordance with one or more embodiments. Last, a section entitled "Example System" describes an example system that can be used to implement one or more embodiments.

Consider now an example operating environment in which one or more embodiments can be implemented.

Example Environment

Figure 1:
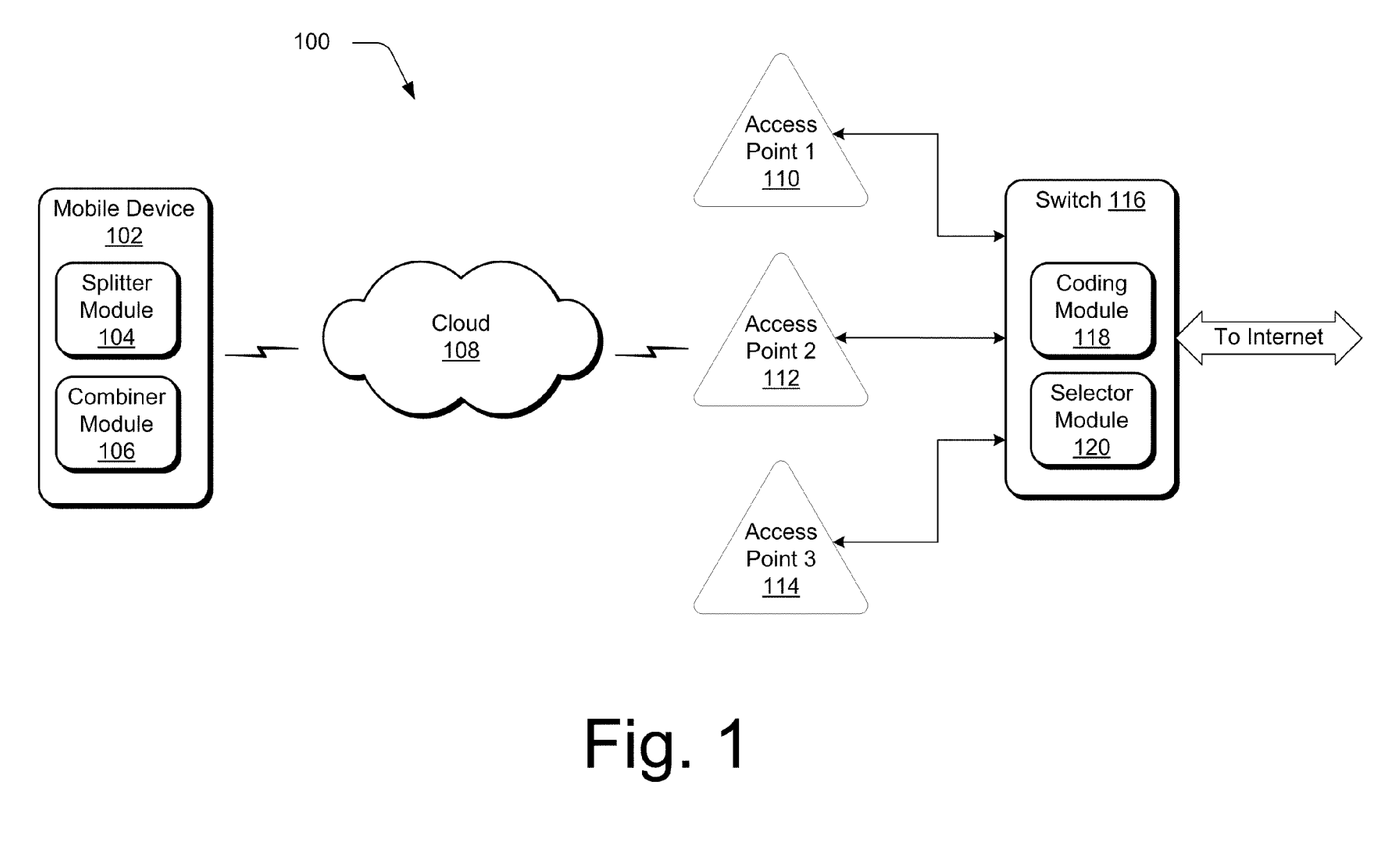
FIG. 1 is an illustration of an example environment in accordance with one or more embodiments.

FIG. 1 illustrates an example environment in which soft-handoffs in Wi-Fi networks can be employed in accordance with one or more embodiments. A soft-handoff enables a mobile computing device to be simultaneously connected to two or more wireless networks for data transfer. Illustrated environment 100 includes an example mobile computing device 102 that may be configured in a variety of ways. For example, mobile computing device 102 may be configured as a traditional laptop computer, a mobile phone, a Personal Digital Assistant (PDA), a tablet PC, and so forth. Mobile computing device 102 also includes software that causes the device to perform one or more operations as described below.

Mobile computing device 102 includes a splitter module 104 and a combiner module 106. The splitter and combiner modules can be implemented in connection with any suitable type of hardware, software, firmware or combination thereof. In at least some embodiments, the splitter and combiner modules are implemented in software that resides on some type of tangible, computer-readable storage medium. The computer-readable storage media can include, by way of example and not limitation, all forms of volatile and non-volatile memory and/or storage media that are typically associated with a computing device. Such media can include ROM, RAM, flash memory, hard disk, removable media and the like. One specific example of a computing device is shown and described below in FIG. 7.

Splitter module 104 and combiner module 106 are representative of functionality that manages sending and receiving, respectively, data on a device maintaining multiple connections. In one or more embodiments, the multiple connections are connections to multiple wireless networks. Splitter module 104 may be configured to ensure that outgoing data on mobile computing device 102 is sent through at least some of the multiple connections. In addition, combiner module 106 can be configured to recognize multiple copies of data received by the device and select a best representation of the data to be consumed, as described below.

Environment 100 also includes a "cloud" 108, which represents signals in one or more wireless networks between mobile computing device 102 and access points 110, 112 and 114. For example, cloud 108 may represent wireless signals used as part of, a Time Division Multiple Access (TDMA) based wireless network, a Frequency Division Multiple Access (FDMA) based wireless network, or any combination thereof, such as an IEEE 802.11 wireless network, via which a computing device can connect with the Internet. Mobile device 102 and access points 110, 112 and 114 additionally contain hardware, software, firmware, or any combination thereof to transmit, receive and decipher the wireless signals represented in cloud 108.

Access points 110, 112, and 114 each represent a point of interconnection between a wireless network and a fixed wire network. Each access point can serve multiple users within a defined physical network area. While FIG. 1 illustrates three access points, it is to be appreciated that any suitable number of access points and/or base stations can be used without departing from the spirit of the claimed subject matter. The overall physical size of wireless network access is related proportionally to the number and location of access points and/or base stations in a region. An access point has the hardware, software, firmware, and any combination thereof, to transmit and receive wireless signals, as well as send and receive data over traditional fixed wires. An access point's connection into traditional fixed wires can be accomplished in any suitable way. Additionally, access points 110, 112 and 114 can be associated with a same wireless network, associated with separate wireless networks, and/or associated with a same switch, such as a switch to bridge a connection to the Internet.

FIG. 1 illustrates access points 110, 112, and 114 connected to a switch 116 which links the access points to the Internet. Switch 116 contains a coding module 118 and a selector module 120. Coding module 118 can be configured to recognize that mobile computing device 102 is connected to multiple wireless networks, and ensure that data originating from a fixed wire connection destined for device 102 is transmitted on any determined wireless network connected to the device. Selector module 120 can be configured to recognize multiple copies of data received from mobile device 102 and select the best representation of the data to be forwarded to the appropriate destination. Having considered an example operating environment, consider now a discussion of an example operation in which a mobile computing device connects to multiple wireless networks simultaneously.

Figure 2:
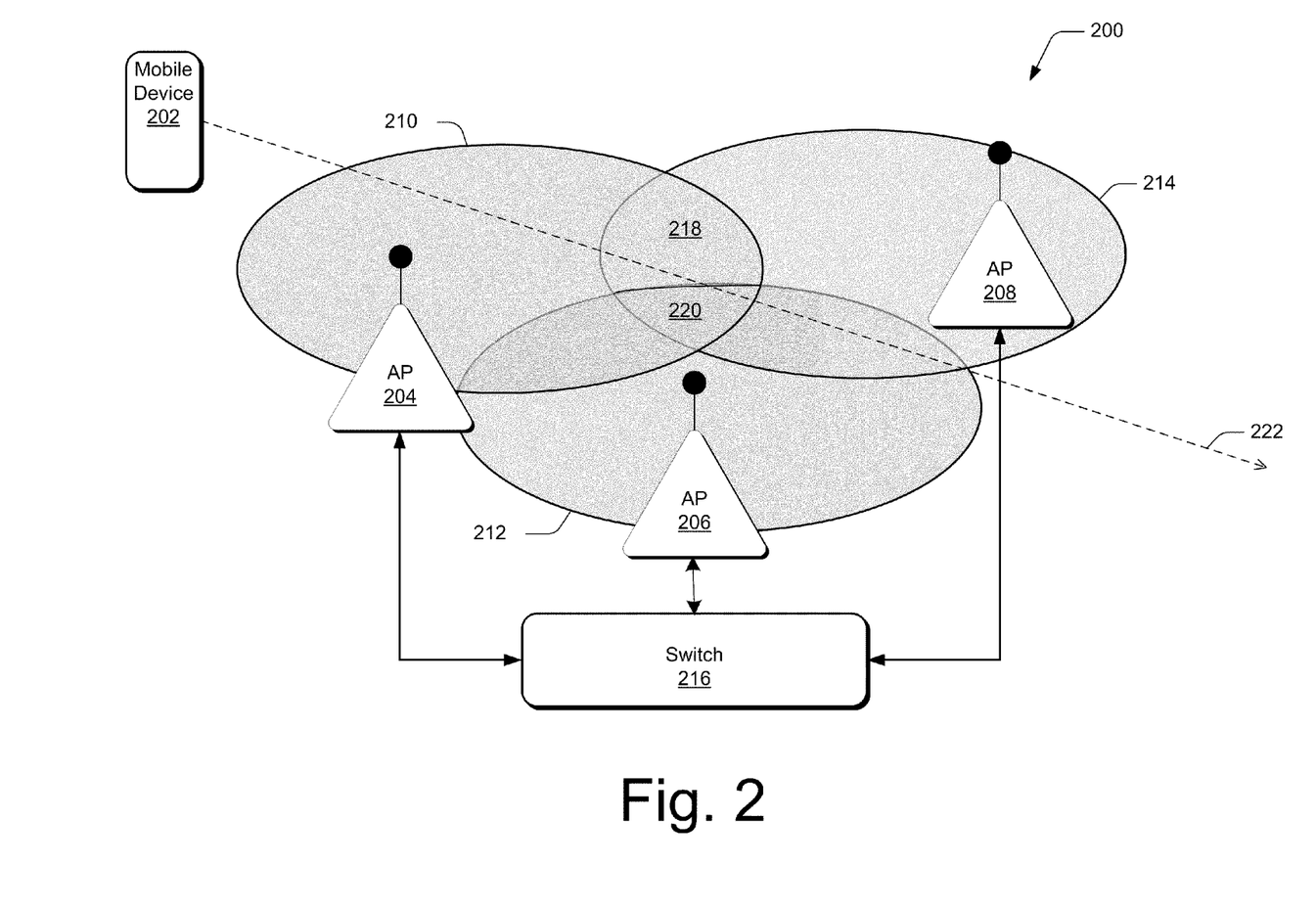
FIG. 2 illustrates an example implementation in operation in accordance with one or more embodiments.

FIG. 2 illustrates a system 200 in which an example operation can take place in accordance with one or more embodiments. System 200 includes a mobile computing device 202, as well as access points 204, 206, and 208. Each access point provides wireless coverage for a corresponding region, represented by oval regions 210, 212, and 214, respectively. Additionally, each access point has a connection into switch 216 which, in turn, provides connectivity to systems outside a wireless network, such as the Internet. As illustrated, the access points can have overlapping coverage areas. For instance, sub-region 218 identifies coverage overlap between coverage regions 210 and 214. Similarly, sub-region 220 identifies coverage overlap between coverage regions 210, 212 and 214.

As mobile computing device 202 traverses through an area, it can wander into regions with single or multiple wireless network coverage, as illustrated by line 222. Line 222 represents a path of the device relative to various coverage regions. When mobile computing device 202 moves into region 218, the device can detect whether the wireless networks associated with access points 204 and 208 are associated with the same wireless network and/or switch. Upon this determination, the device can maintain simultaneous connections to both access points. Similarly, when the device moves into region 220, it can maintain connections to access points 204, 206 and 208. As mobile computing device 202 moves in and out of regions with multiple wireless network coverage, it can use the simultaneous wireless network connections to maintain seamless data transfer, which is further described below. Furthermore, through the use of soft handoffs, a mobile computing device, as well as associated access points, can continue to use high modulation rates longer instead of reverting to lower modulation rates in an attempt to maintain a link as long as possible to a single connection. While the transmission range of a lower modulation rate is higher, it utilizes more time, which corresponds to more spectrum utilization, to convey the data. Thus, the ability to use a high modulation rate allows for more efficient data transfer.

Having described an example environment and high level operation, consider now a discussion of how a mobile computing device can maintain simultaneous wireless connections using a single radio, in accordance with one or more embodiments.

Maintaining Simultaneous Wireless Network Connections

Various embodiments provide an ability for a mobile computing device to maintain two or more simultaneous wireless network connections without utilizing multiple radios. Communication with two or more wireless networks typically means that a device will disconnect from a first wireless network, then establish a new connection with a second wireless network in order to communicate with the second wireless network. In one or more embodiments, a mobile computing device can establish connections to two or more wireless networks simultaneously without having to disconnect from any of the networks. For example, a device can establish two or more wireless network connections and switch data transfer and receipt seamlessly between the networks when desired, such as, if a connection with one of the networks degrades.

In one embodiment, a mobile computing device may send and/or receive wireless signals on a first network, and then send and/or receive wireless signals on one or more additional networks without disconnecting from the first network. For example, after establishing two or more wireless network connections, a mobile computing device can communicate to a first wireless network that the mobile computing device is entering a power saving mode (or "sleep period"), thus discouraging communication with the mobile computing device. Connected networks that perceive the device to be in a power saving mode can then buffer data that would normally otherwise be sent to the device. Instead of actually going into a power saving mode as declared, the mobile computing device can switch to exchange data with another wireless network. When a wireless network perceives that the mobile computing device is no longer in power saving mode (e.g. by entering an "awake" mode), previously buffered data can then be sent to the device. In one or more embodiments, the buffered data can be discarded by an access point if the mobile computing device fails to reconnect or fails to obtain the packets in a timely fashion.

Figure 3:
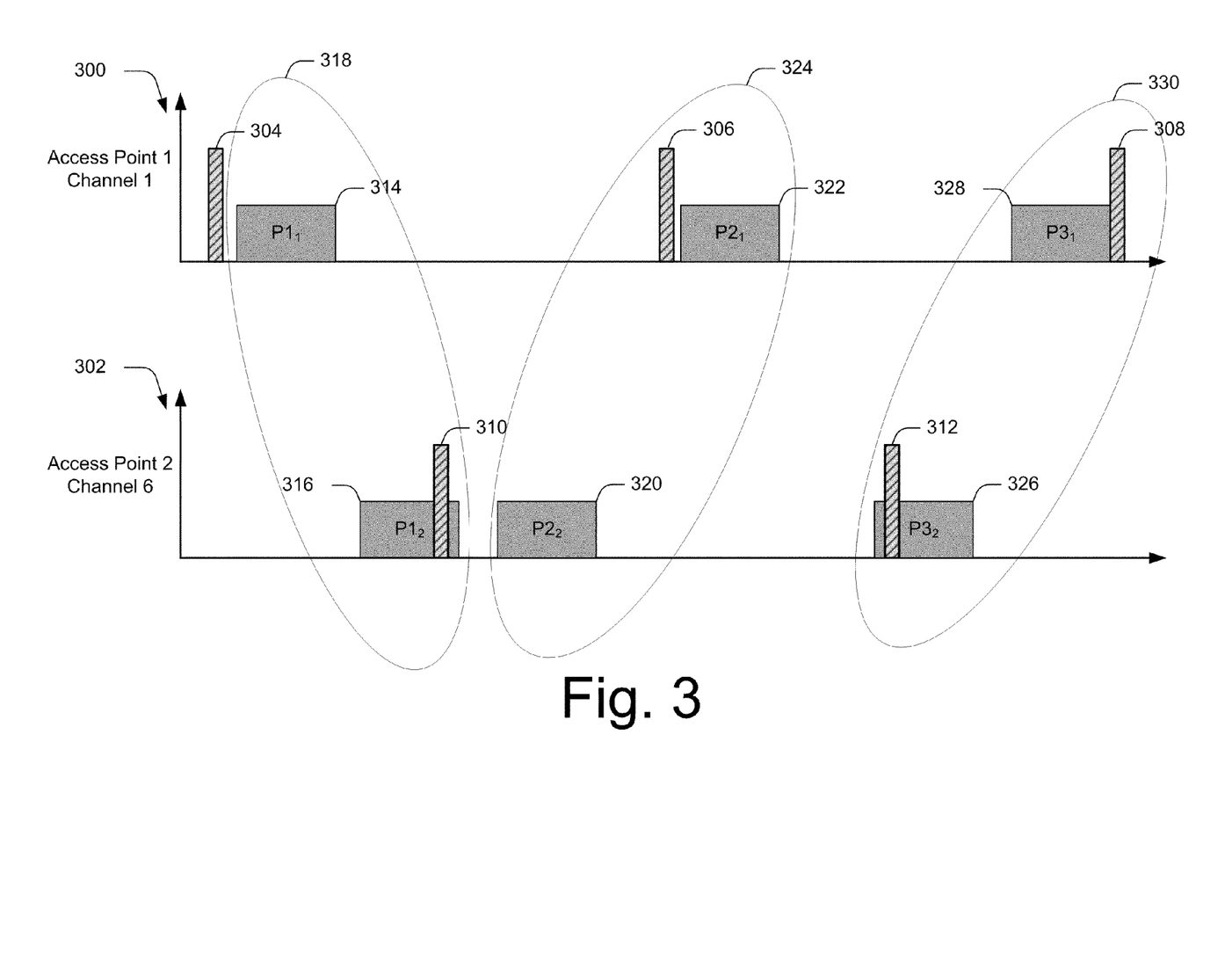
FIG. 3 is an illustration of a timing diagram in accordance with one or more embodiments.

As an example, consider FIG. 3, which illustrates a relationship between data transmissions on multiple wireless networks connected to the same mobile computing device. Graphs 300 and 302 illustrate data transmissions from wireless networks associated with access points 1 and 2, respectively. While FIG. 3 only shows two access points connected to the same mobile computing device, it is to be appreciated and understood that any number of access points, as well as channels, can be used without departing from the spirit of the claimed subject matter.

Horizontal axes of graphs 300 and 302 represent time while vertical axes represent signal amplitude. Over time, each access point can transmit various bursts of data, such as a beacon. As part of a standard Wi-Fi system, an access point transmits beacons on regular intervals. This is demonstrated for access point 1 with beacons 304, 306 and 308, and with beacons 310 and 312 for access point 2. Beacons can be used by a mobile computing device to identify the presence of an access point, as well by an access point to convey relevant information, such as what data rates are supported by the access point, specific signaling methods that may be supported, capability information, and the like. Additionally, beacons can be used by an access point to indicate that there are buffered frames waiting to be transmitted to a particular device.

As discussed above, graphs 300 and 302 represent a snapshot of data transmissions from two access points connected to the same mobile computing device. At the start of graphs 300 and 302, access point 1 is engaged in an active connection with the device, while access point 2 perceives the device to be in power saving mode, and therefore maintains an inactive connection with the device. Since access point 1 is actively communicating with the mobile computing device, when data is to be sent, access point 1 transmits burst 314, which contains data $P1_1$. At some point after receiving burst 314, the mobile computing device indicates to access point 1 that it is going into power saving move, and switches its active connection to access point 2. While not illustrated, this can entail some minimal communication between the device and one or more access points. Upon resuming active communication with the mobile computing device, access point 2 transmits data it may have been holding or buffering for the device. For instance, the device can request previous data by using a PS-POLL or UAPSD messages, or can simply send an indication to an access point that the device is no longer in power saving mode, or has "woken up", and is ready to receive data. In this example, access point 2 transmits burst 316, which contains data $P1_2$. Data $P1_2$ represents at least a partial replication of data $P1_1$-transmitted by access point 1. This process of a mobile computing device switching access points and receiving buffered data from an access point can repeat itself numerous times across many different access points. Oval 318 represents the complete exchange of P1 data to the device through the multiple wireless networks connected to the mobile computing device. Upon receipt of multiple copies of P1 data, the mobile computing device compares the copies to determine a best representation of the data, as further described below.

After the transmission of burst 316, access point 2 has additional data to send to the mobile computing device. Since access point 2 is currently maintaining an active connection with the device, this data is transmitted in burst 320, which contains data $P2_2$. Mobile computing device may or may not receive burst 320, but at some point after burst 320 is transmitted, the device indicates to access point 2 that it is going into power saving mode, and switches its active communication back to access point 1. The determination to switch between wireless networks, and their associated access points, can be made in any suitable way, an example of which is further described below. Similar to access point 2, when access point 1 resumes its active connection with the device, buffered data or new data is transmitted to the device. In this illustration, buffered data is transmitted, as represented by burst 322 containing data $P2_1$. Oval 324 represents a complete exchange of P2 data to the mobile computing device through multiple wireless networks connected to the device. As time progresses, the mobile computing device continues to switch between access points 1 and 2. In response, the access points continue to transmit when an active connection is resumed. This is further illustrated with bursts 326 and 328, containing additional data $P3_x$, in complete P3 data exchange 330. In one or more embodiments, as the mobile computing device transitions between wireless networks, it can receive multiple copies of the same data.

By virtually alternating in and out of power saving mode with various wireless networks, a mobile computing device can quickly switch between the networks without disconnecting, thus allowing the device to save time and/or resources utilized to reestablish connections with the wireless networks. For example, some wireless networks utilize authentication protocols for network security purposes. Disconnecting from such networks typically means that a mobile computing device has to perform a re-authentication process before being able to again communicate with the network. By communicating a transition into and out of power saving mode to a network, a mobile computing device can remain connected to multiple networks without having to re-authenticate when alternating between the networks.

Figure 4:
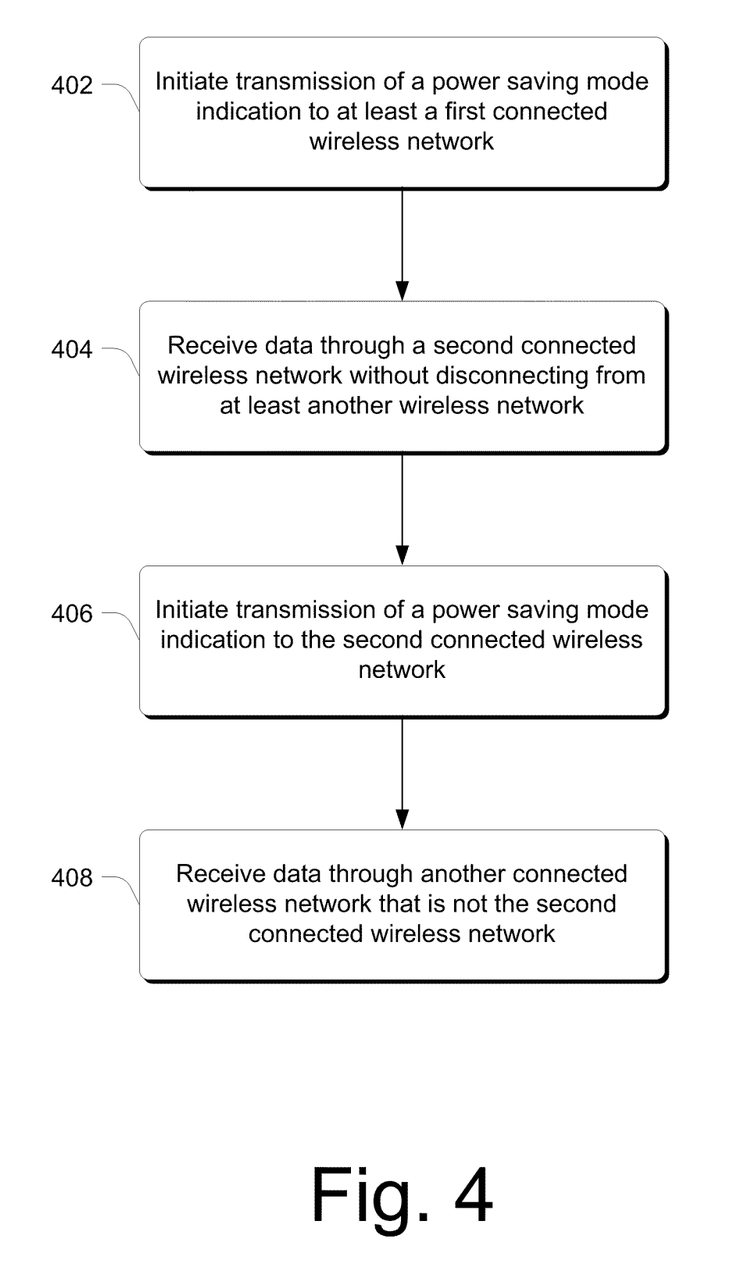
FIG. 4 is a flow diagram that describes steps in a method in accordance with one or more embodiments.

As described above, a mobile computing device can alternate between two or more wireless networks without disconnecting from the wireless networks and without utilizing multiple radios. The decision of when to transition an active connection between two or more wireless networks can be determined in any suitable way. For instance, a mobile computing device can determine when to switch between networks and transmit a power saving mode indication to one or more networks based upon information contained in one or more beacons associated with the one or more wireless networks, signal strength and/or degradation, volume of data transfer, number of networks detected, and the like. Furthermore, the device can pause before jumping to a next channel to reduce power consumption, or scan access points for non-overlapping channels. As a device switches from network to network, the device can send and receive multiple copies of the same data, thus increasing the likelihood of real-time data continuity as the device moves from one region to the next. Having considered example implementations in operation, consider now a discussion of steps in a method that facilitates multiple simultaneous connections with wireless networks using a single radio FIG. 4 illustrates a flow diagram of a method in accordance with one or more embodiments. The method can be implemented in connection with any suitable hardware, software, firmware or combination thereof. In at least some embodiments, aspects of the method can be implemented by a suitably configured device, such as mobile computing device 102 (FIG. 1).

Step 402 initiates transmission of a power saving mode indication to at least a first connected wireless network. For example, a mobile device that is connected to four wireless networks simultaneously may indicate to three of the wireless networks that it is going into power saving mode to maintain a passive or idle connection with the three networks, thus enabling an active connection with the fourth wireless network. As described above, a power saving mode indication can temporarily silence or buffer communication between a mobile computing device and an access point. It is to be appreciated and understood that any number of networks can be connected simultaneously without departing from the spirit of the claimed subject matter.

Step 404 receives data, via a mobile computing device, through a second wireless network connected to the mobile computing device without disconnecting from at least another wireless network. The second connected wireless network is a network that does not perceive the mobile computing device to be in a power saving mode and is a wireless network actively communicating or exchanging data with the mobile computing device. This step can include creating a new active connection with the second wireless network or resuming an existing connection with the second wireless network. For example, a mobile computing device can indicate to the wireless network that it is coming out of power saving mode or actively fetch buffered data.

Step 406 initiates transmission, via the mobile computing device, of a power saving mode indication to the second connected wireless network. As described above, this message effectively switches an active connection with the mobile computing device to an idle or passive connection. The decision to transition from an active connection with the second connected wireless network to an idle or passive connection can be determined in any suitable way, examples of which are described above. Responsive to transmitting a power saving mode indication to the second connected wireless network, step 408 enables the mobile computing device to be available to receive data through another connected wireless network that is not the second connected wireless network. One way that this can be done is to transmit to the other connected wireless network an indication that the device is entering an awake mode. The received data can contain all, partial or no data duplication with the data received from the second connected wireless network. Similar to step 404, receiving the data is achieved without disconnecting from the second connected wireless network, or other connected wireless networks, and can encompass establishing a new connection with another wireless network, or resuming an existing connection (as by transmitting an awake mode indication as noted above).

Having described how a mobile computing device can maintain multiple connections with wireless networks, consider now a discussion of how data can be managed through the multiple connections in accordance with one or more embodiments.

Data Management

Various embodiments provide an ability for data management associated with a mobile computing device that is simultaneously connected to multiple wireless networks using a single radio. Data management can include sending and receiving two or more transmissions of data over individual wireless networks, where the data transmissions can include at least some duplicate data. For example, a mobile computing device can recognize existing connections, whether active or inactive, and replicate outgoing data to each connection. Similarly, the mobile device can identify multiple copies of incoming data, select a best representation of the data, and sequence the data for consumption. In another embodiment, a switch that is wirelessly connected to a mobile computing device through multiple wireless networks can ensure that two or more networks connected to a same device have access to the same data destined for that device. Alternately or additionally, the switch can combine incoming data from the device connected to multiple networks so as to reduce or eliminate unnecessary redundancy.

Figure 5:
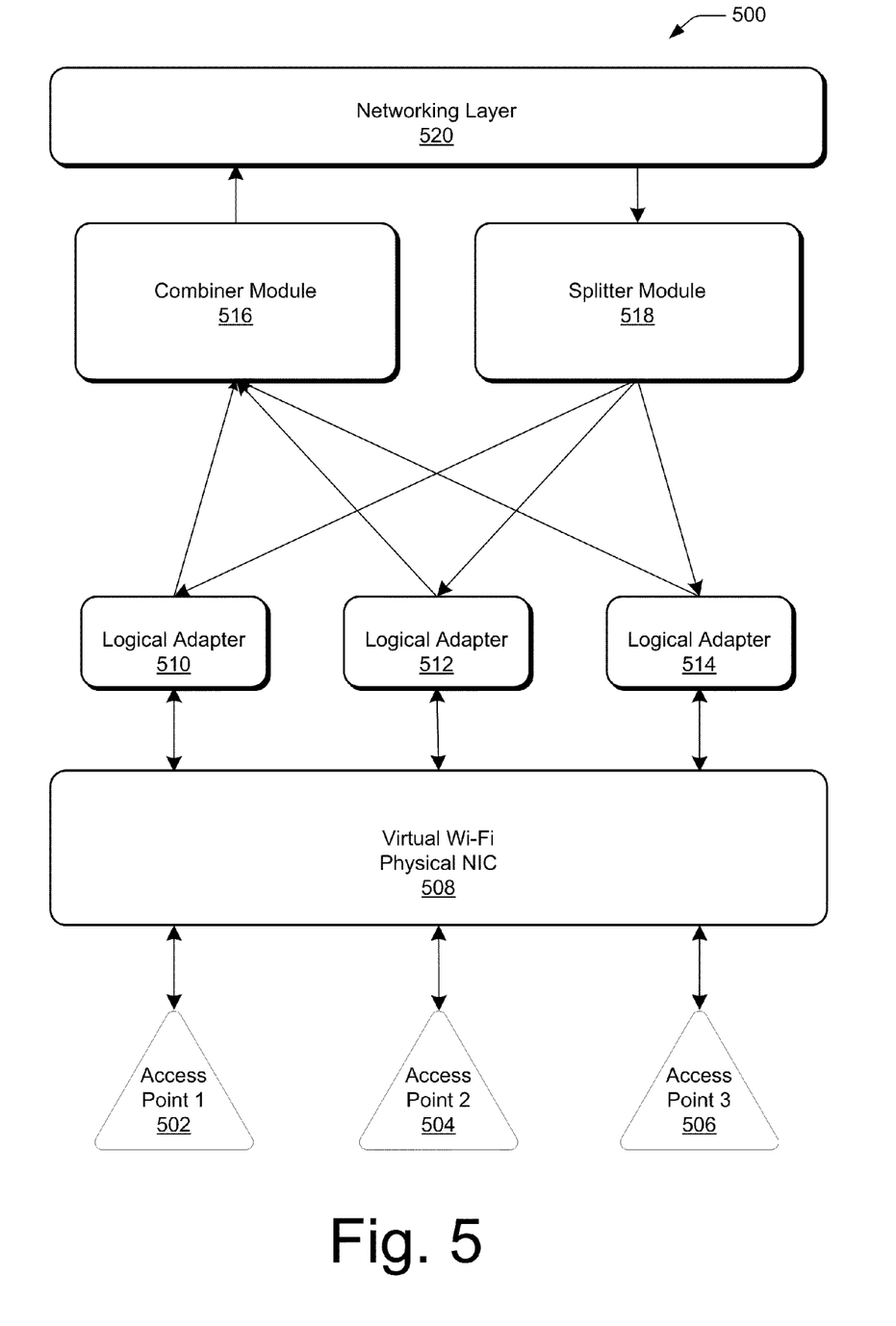
FIG. 5 is a logical diagram of an architecture in accordance with one or more embodiments.

Consider FIG. 5, which illustrates a logical diagram of an example architecture in accordance with one or more embodiments. In this example, a system 500 includes multiple access points 502, 504 and 506. While FIG. 5 illustrates the system as including three access points, it is to be appreciated and understood that any number of access points can be included in the system without departing from the scope of the claimed subject matter. Wireless networks associated with these access points can connect to a mobile computing device through Virtual Wi-Fi Physical Network Interface Card (NIC) 508, which represents hardware, software, firmware, and any combination thereof utilized to maintain multiple, simultaneous wireless network connections with the device using a single radio. In addition to supporting wireless connections to and from the mobile computing device with one or more access points, NIC 508 interfaces with logical adapters 510, 512 and 514.

Logical adapters 510, 512 and 514 each represent, to a mobile computing device, a logical connection with a wireless network. For example, logical adapter 510 represents a logical connection with a wireless network associated with access point 502. Similarly, logical adapters 512 and 514 each represent a logical connection with wireless networks associated with access points 504 and 506, respectively. A logical adapter sets up a logical connection with a corresponding access point, and sends and receives frame data with the access point through NIC 508. While each logical adapter connects through the same physical adapter, the connection is virtualized through a driver and/or operating system. Multiple logical adapters represent multiple logical connections, regardless of whether the physical connection is through the same physical adapter, with the same access point, or with multiple access points.

In addition to communicating with access points through NIC 508, logical adapters 510, 512 and 514 communicate with combiner module 516 and splitter module 518. As data is received from an access point, a logical adapter passes relevant data up to combiner module 516. In various embodiments, the combiner module receives multiple copies of the same data from two or more logical adapters and determines a best representation of the data to pass up to networking layer 520 for further consumption. A best representation of data can be determined in any suitable way, such as, by way of example and not of limitation, considering bit error rate of each copy, access point signal strength, access point response time, and the like. Alternately or additionally, combiner module 516 may forward a packet without waiting for reception of all copies to select a best representation For example, if the combiner module determines a received copy is "good enough" or/and an expiry timeout is reached, the combiner module may forward the received copy with minimal or no comparisons to additional packets. In addition to determining a best representation of incoming data from one or more access points, combiner module 516 can further sequence the best representation of the incoming data with other best representations of previously received data as needed before passing to networking layer 520.

In addition to receiving data from one or more logical adapters, networking layer 520 can send outgoing data to splitter module 518. One aspect of maintaining two or more connections to two or more wireless networks is attempting to preserve and enhance data continuity. Splitter module 518 represents functionality that facilitates this. In one or more embodiments, outgoing data can be replicated for at least two or more wireless networks connected to a mobile computing device. Upon receiving outgoing data from networking layer 520, splitter module 518 can determine wireless networks with connections to the mobile computing device, and send a copy of the data to each corresponding logical adapter. In some embodiments, one or more packets may be discarded prior to sending when it has been determined that transmission of a duplicate packet on another connection has succeeded or/and an expiry timeout for a packet was reached a successful transmission can be determined in many ways, such as through the receipt of a positive acknowledgement. Connections can be determined in any suitable way, such as by maintaining a list of logical adapters, querying for connections states, receiving notifications, and the like.

While not illustrated in FIG. 5, access points 502, 504 and 506 can be connected to a switch, similar to switch 116 (FIG. 1). As seen in FIG. 1 and discussed above, switch 116 includes coding module 118 and selector module 120. Similar to that which is described above in the case of a mobile computing device, switch 116 provides the ability to send and receive multiple copies of data over two or more wireless network connections connected to a same mobile computing device. Coding module 118 can provide analogous capabilities as that of splitter module 518. For example, coding module 118 can identify data from a fixed wire connection that is destined for a mobile computing device connected to two or more access points, and ensure that outgoing data is replicated or copied as needed to the two or more access points. Similarly, selector module 120 can implement comparable functionality to that of combiner module 516. As copies of data are received from multiple access points by the switch, selector module 120 can compare the copies and select a best representation to be forwarded to a fixed wire connection.

Figure 6:
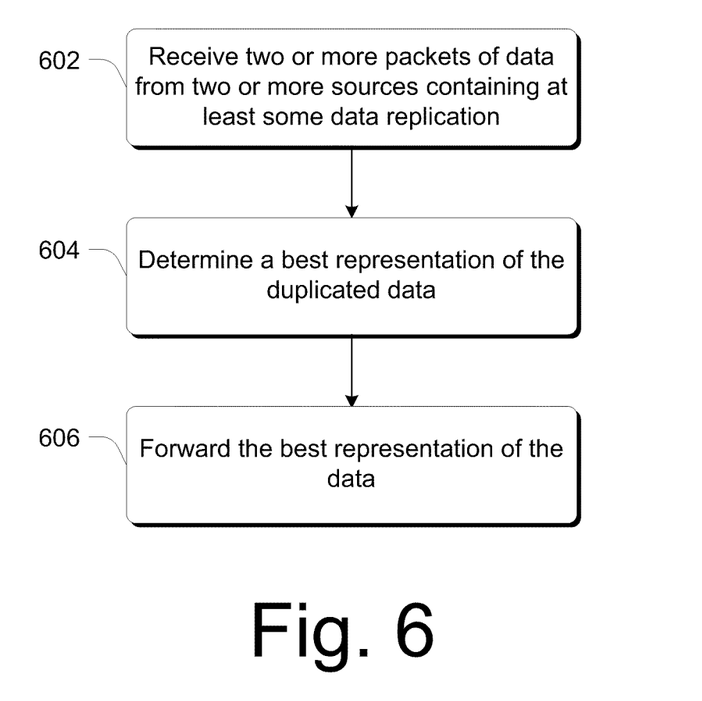
FIG. 6 is a flow diagram that describes steps in a method in accordance with one or more embodiments.

FIG. 6 is a flow diagram that describes steps in a method in accordance with one or more embodiments. The method can be implemented in connection with any suitable hardware, software, firmware or combination thereof. In at least some embodiments, aspects of the method can be implemented by a suitably configured software module, such as combiner module 106 or selector module 120 (FIG. 1).

Step 602 receives two or more packets of data from at least two or more sources. In the illustrated and described embodiment, the packets each contain at least some data duplication between them. For example, in one or more embodiments, each packet can contain all or part of the same data in their payload, while having packet specific identifiers and/or parameters in other portions of the packet, such as identifiers associated with the source of a packet. In another embodiment, the two or more packets can be identical to one another. Alternately or additionally, some received packets can be identical to one another, while other received packets can contain partial to no data duplication. Thus, any combination of identical, partial and no duplication between the two or more data packets can exist without departing from the scope of the claimed subject matter. Sources of the received data can vary from one another, such as from two or more wireless networks.

Step 604 determines a best representation of the duplicated data. In one or more embodiments, a duplicate packet can be marked or identified by a unique identifier, such as a counter value, a randomly generated identifier, a Globally Unique Identifier (GUID), and the like. Alternately or additionally, duplicate packets can be identified through the use of a checksum. The duplicated data can be examined and compared to one or more criteria in order to determine what the best representation is. Any suitable criterion can be used, examples of which are provided above. Responsive to determining the best representation of the duplicated data, step 606 forwards the best representation to one or more intended recipients.

Figure 7:
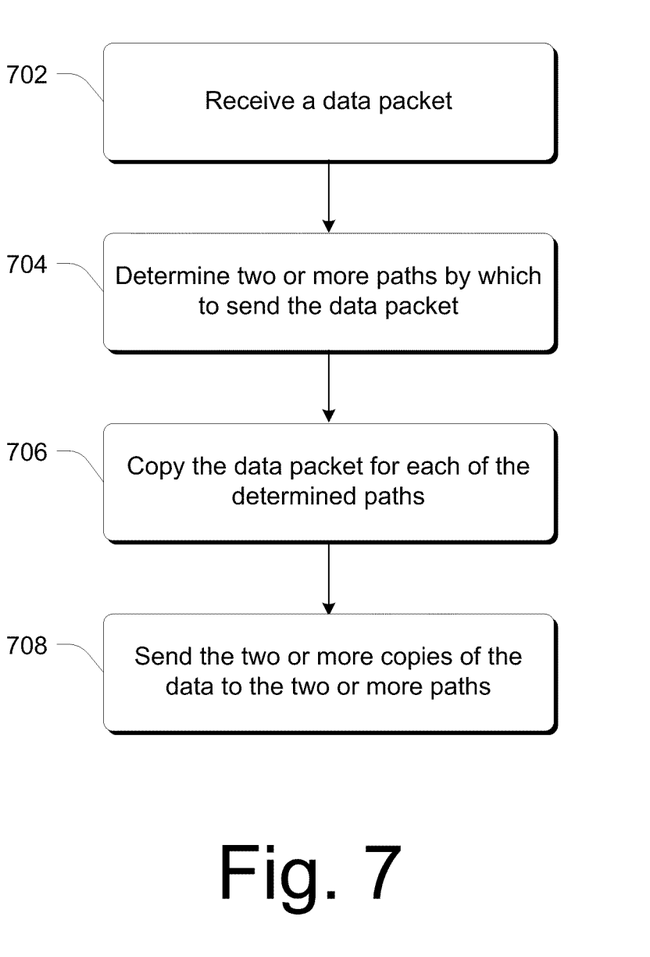
FIG. 7 is a flow diagram that describes steps in a method in accordance with one or more embodiments.

FIG. 7 is a flow diagram that describes steps in a method in accordance with one or more embodiments. The method can be implemented in connection with any suitable hardware, software, firmware or combination thereof. In at least some embodiments, aspects of the method can be implemented by a suitably configured software module, such as splitter module 104 or coding module 118 (FIG. 1).

Step 702 receives a data packet. Responsive to receiving a data packet, step 704 determines two or more paths by which to send the data packet. In one or more embodiments, the data packet can further be identified as a packet destined for two or more access points associated with two or more wireless networks, as described above. Responsive to determining two or more paths, step 706 copies the data for each determined path. In one or more embodiments, a data packet is copied identically for each path. In another embodiment, the outgoing data is copied, at least in part, into an individual format for each determined path, such as for each determined wireless network. For example, each determined path may utilize separate identifiers, parameters, and/or packet formatting in addition to the payload data. Thus, step 706 can copy part or all of the data from the received data packet in step 702 to a format utilized by the determined paths. Responsive to copying the data, step 708 sends the copied data packets via the determined paths.

Having described various embodiments of data management, consider now an example system that can be utilized to implement one or more of the above-described embodiments.

Example System

Figure 8:
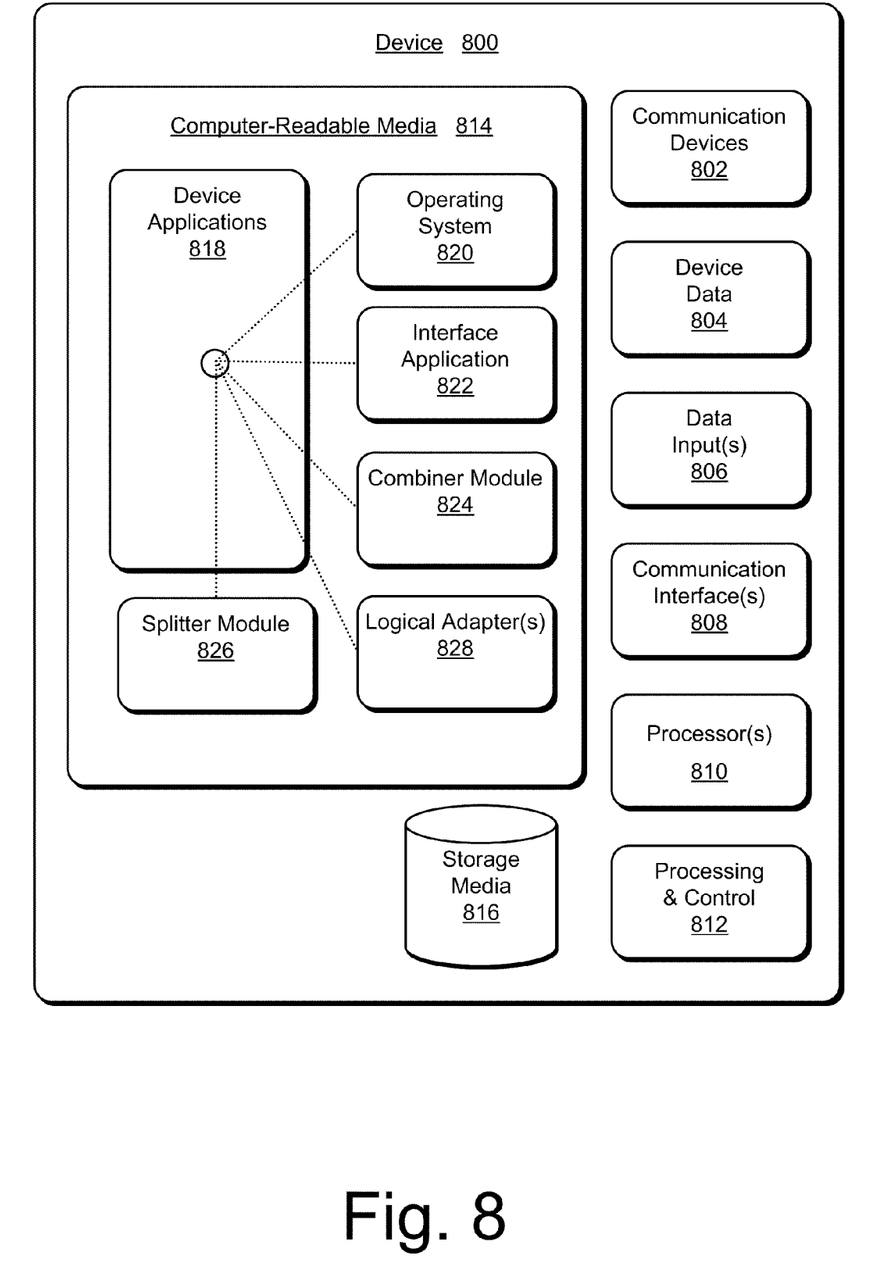
FIG. 8 illustrates an example system that can be used to implement one or more embodiments.

FIG. 8 illustrates various components of an example device 800 that can be implemented as any type of portable and/or computer device as described with reference to FIG. 1 to implement embodiments of soft-handoffs in Wi-Fi systems described herein. Device 800 includes communication devices 802 that enable wired and/or wireless communication of device data 804 (e.g., received data, data that is being received, data scheduled for broadcast, data packets of the data, etc.). The device data 804 or other device content can include configuration settings of the device, media content stored on the device, and/or information associated with a user of the device. Media content stored on device 800 can include any type of audio, video, and/or image data. Device 800 includes one or more data inputs 806 via which any type of data, media content, and/or inputs can be received, such as user-selectable inputs, messages, music, television media content, recorded video content, and any other type of audio, video, and/or image data received from any content and/or data source.

Device 800 also includes communication interfaces 808 that can be implemented as any one or more of a serial and/or parallel interface, a wireless interface, any type of network interface, a modem, and as any other type of communication interface. The communication interfaces 808 provide a connection and/or communication links between device 800 and a communication network by which other electronic, computing, and communication devices communicate data with device 800.

Device 800 includes one or more processors 810 (e.g., any of microprocessors, controllers, and the like) which process various computer-executable or readable instructions to control the operation of device 800 and to implement the intelligent input handling described above. Alternatively or in addition, device 800 can be implemented with any one or combination of hardware, firmware, or fixed logic circuitry that is implemented in connection with processing and control circuits which are generally identified at 812. Although not shown, device 800 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

Device 800 also includes computer-readable media 814, such as one or more memory components, examples of which include random access memory (RAM), non-volatile memory (e.g., any one or more of a read-only memory (ROM), flash memory, EPROM, EEPROM, etc.), and a disk storage device. A disk storage device may be implemented as any type of magnetic or optical storage device, such as a hard disk drive, a recordable and/or rewriteable compact disc (CD), any type of a digital versatile disc (DVD), and the like. Device 800 can also include a mass storage media device 816.

Computer-readable media 814 provides data storage mechanisms to store the device data 804, as well as various device applications 818 and any other types of information and/or data related to operational aspects of device 800. For example, an operating system 820 can be maintained as a computer application with the computer-readable media 814 and executed on processors 810. The device applications 818 can include a device manager (e.g., a control application, software application, signal processing and control module, code that is native to a particular device, a hardware abstraction layer for a particular device, etc.). The device applications 818 also include any system components or modules to implement embodiments of soft-handoffs in Wi-Fi networks as described herein. In this example, the device applications 818 include an interface application 822, a combiner module 824, a splitter module 826 and logical adapter(s) 828 that are shown as software modules and/or computer applications. The splitter module 824 is representative of software that is configured to duplicate, at least in part, outgoing data on device 800 through at least some of the multiple connections. Combiner module 826 is representative of software that can recognize two or more data packets that include at least some duplicate data and determine a best representation of the duplicate data to be consumed by device 800. Logical adapter module(s) 828 represent logical connections with associated wireless networks, and are configured to send and receive frame data with each associated wireless network through a single radio. Alternatively or in addition, the interface application 822, the splitter module 824, the combiner module 826 and the logical adapter(s) 828 can be implemented as hardware, software, firmware, or any combination thereof.

CONCLUSION

Various embodiments enable a device to maintain a plurality of connections to a plurality of wireless networks simultaneously using one radio. For instance, a device can partition in time, or "time-slice", when it transmits and receives data such that a device can maintain a plurality of connections with a plurality of networks concurrently. With the plurality of connections, the device can receive multiple copies of data. In some embodiments, a device can compare multiple copies of data and determine which copy of data is a best representation. Once a best representation has been determined, it can be selected for further usage. While described in the context of a Wi-Fi system, it is to be appreciated and understood that the concepts described above can be applied to other wireless systems, such as a TDMA based network, FDMA based network, Worldwide Interoperability for Microwave Access (WiMax) based network, or any combination thereof, without departing from the spirit of the claimed subject matter.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A mobile computing device comprising:
   one or more communication devices, wherein the one or more communication devices are configured to enable connection to two or more wireless networks simultaneously so that the mobile computing device can communicate, through a single radio, with said two or more wireless networks;
   one or more computer-readable storage media;
   a combiner module embodied, at least in part, on the computer-readable storage media, the combiner module being configured to:
     recognize two or more data packets that include completely duplicated payload data;
     recognize two or more data packets that include partially duplicated payload data; and
     determine a best representation of the duplicate payload data based, at least in part, on the completely duplicated payload data or the partially duplicated payload data;
   a splitter module embodied, at least in part, on the computer-readable storage media, the splitter module being configured to send outgoing data through the two or more wireless networks, wherein the splitter module is configured to duplicate outgoing data, at least in part, on each of the two or more wireless networks when the two or more wireless networks are connected to the mobile computing device; and
   one or more logical adapters embodied, at least in part, on the computer-readable storage media, individual logical adapters being associated with individual wireless networks and configured to send and receive frame data to an associated individual wireless network through the single radio.

2. The mobile computing device of claim 1, wherein the two or more wireless networks are IEEE 802.11 wireless networks.

3. The mobile computing device of claim 1, wherein to determine a best representation comprises using bit error rate of each data packet as a criterion.

4. The mobile computing device of claim 1, wherein to enable connection to two or more wireless networks simultaneously comprises:
   initiating transmission of a power saving mode indication to at least a first wireless network of the two or more wireless networks and actively communicating with a second wireless network of the two or more wireless networks without disconnecting from the at least first wireless network;

receiving data through the second wireless network without disconnecting from the at least first wireless network;

initiating transmission of a power saving mode indication to the second wireless network; and receiving data through a wireless network different from the second wireless network.

5. The mobile computing device of claim 4, wherein said wireless network that is different from the second wireless network comprises the first wireless network.

6. The mobile computing device of claim 1, wherein to duplicate outgoing data comprises copying the outgoing data, at least in part, into an individual format for each of the two or more wireless networks.

7. The mobile computing device of claim 1, wherein the combiner module is further configured to sequence the best representation of the data with other best representations of previously received data.

8. A computer-implemented method comprising:

initiating transmission, via a mobile computing device using a single radio, of a power saving mode indication to at least a first wireless network connected to the mobile computing device;

receiving data, via the mobile computing device using the single radio, through a second wireless network connected to the mobile computing device without disconnecting from the at least first wireless network;

initiating transmission, via the mobile computing device using the single radio, of a power saving mode indication to the second wireless network; and receiving data, via the mobile computing device using the single radio, through a wireless network that is different from the second wireless network, wherein the receiving data through the wireless network different from the second wireless network comprises an ability to:

receive and identify partial payload data duplication in the data received through the wireless network different from the second wireless network and payload data associated with the data received from the second wireless network; and receive and identify complete payload data duplication in the data received through the wireless network different from the second wireless network and payload data associated with the data received from the second wireless network.

9. The computer-implemented method of claim 8, wherein the at least first wireless network and the second wireless network are IEEE 802.11 wireless networks.

10. The computer-implemented method of claim 8, wherein initiating transmission of a power saving mode indication to the second wireless network comprises determining when to initiate transmission based upon information contained in one or more beacons.

11. The computer-implemented method of claim 8, further comprising determining a best representation of data that is received.

12. The computer-implemented method of claim 11, wherein determining a best representation comprises using bit error rate of the data as a criterion.

13. The computer-implemented method of claim 8, wherein receiving data through the wireless network different from the second wireless network comprises initiating transmission of an indication to the different wireless network that the mobile computing device is no longer in power saving mode.

14. The computer-implemented method of claim 8, wherein initiating transmission of the power saving mode indication to the at least first wireless network is based, at least in part, on a signal strength associated with the at least first wireless network.

15. A device comprising:

a first module configured to:

enable data management associated with a mobile computing device, simultaneously connected to multiple wireless networks using a single radio, to be performed by receiving two or more transmissions over individual wireless networks of the multiple networks, wherein said two or more transmissions include at least some duplicate data;

identify partial payload data duplication in the at least some duplicate data;

identify complete payload duplication in the at least some duplicate data; and process the two or more transmissions to select a best representation; and a second module configured to:

enable transmission of data through said multiple networks simultaneously connected to the mobile computing device, wherein transmitted data includes at least some duplicate data transmitted through individual wireless networks of the multiple networks.

16. The device of claim 15, wherein the device is the mobile computing device.

17. The device of claim 15, wherein the device is a switch that is wirelessly connected to the mobile computing device through the multiple wireless networks.

18. The device of claim 15, wherein the multiple wireless networks are IEEE 802.11 wireless networks.

19. The device of claim 15, wherein the first module is further configured to determine a best representation of the duplicate data.

20. The device of claim 19, wherein to determine a best representation of the duplicate data comprises using a bit error rate as a criterion.

* * * * *